United States Patent
Igarashi et al.

(10) Patent No.: US 9,457,472 B2
(45) Date of Patent: Oct. 4, 2016

(54) POSITION DETECTION DEVICE FOR ROBOT, ROBOTIC SYSTEM, AND POSITION DETECTION METHOD FOR ROBOT

(75) Inventors: Katsuji Igarashi, Chino (JP); Atsushi Asada, Suwa (JP); Nobuyuki Setsuda, Okaya (JP); Chieko Iuchi, Chino (JP)

(73) Assignee: Seiko Epson Corporation (JP)

( * ) Notice: Subject to any disclaimer, the term of this patent is extended or adjusted under 35 U.S.C. 154(b) by 639 days.

(21) Appl. No.: 13/372,866

(22) Filed: Feb. 14, 2012

(65) Prior Publication Data

US 2012/0209430 A1    Aug. 16, 2012

(30) Foreign Application Priority Data

Feb. 15, 2011   (JP) ................... 2011-029904

(51) Int. Cl.
*G05B 15/00*    (2006.01)
*B25J 9/16*    (2006.01)

(52) U.S. Cl.
CPC .... *B25J 9/1697* (2013.01); *G05B 2219/39397* (2013.01)

(58) Field of Classification Search
CPC ............... B25J 9/1967; G05B 2219/39397
USPC ............................. 700/259; 901/19, 30, 47
See application file for complete search history.

(56) References Cited

U.S. PATENT DOCUMENTS

| | | | | |
|---|---|---|---|---|
| 4,712,970 A * | 12/1987 | Nakamura | ............ | B25J 19/021 414/730 |
| 5,105,368 A * | 4/1992 | Alexandersen | ........ | B25J 9/1692 700/254 |
| 5,350,269 A * | 9/1994 | Azuma | ............ | B25J 9/1697 345/501 |
| 6,434,449 B1 * | 8/2002 | De Smet | .............. | B25J 9/1692 318/568.1 |
| 6,591,160 B2 * | 7/2003 | Hine | ................. | H01L 21/67259 700/189 |
| 7,270,784 B2 * | 9/2007 | Vuong | .............. | G01N 35/1074 422/105 |
| 2002/0068992 A1 * | 6/2002 | Hine | ................. | H01L 21/67259 700/229 |
| 2004/0142486 A1 * | 7/2004 | Weselak | .............. | G01N 35/028 436/174 |
| 2004/0162639 A1 | 8/2004 | Watanabe et al. | | |
| 2008/0235970 A1 * | 10/2008 | Crampton | ............. | B25J 13/088 33/503 |
| 2008/0255704 A1 * | 10/2008 | Braut | ..................... | B25J 13/02 700/264 |
| 2008/0317575 A1 * | 12/2008 | Yamazaki | ......... | G01R 31/2893 414/754 |
| 2009/0099738 A1 * | 4/2009 | Danko | .................. | B25J 9/1607 701/50 |
| 2009/0118864 A1 * | 5/2009 | Eldridge | ............... | B25J 9/1692 700/259 |
| 2009/0125145 A1 * | 5/2009 | Adachi | ................. | B25J 9/0003 700/250 |
| 2009/0157226 A1 * | 6/2009 | de Smet | ................ | B25J 9/1692 700/254 |

(Continued)

FOREIGN PATENT DOCUMENTS

| | | |
|---|---|---|
| JP | 2000-180381 A | 6/2000 |
| JP | 2004-249391 A | 9/2004 |
| JP | 2007-315833 A | 12/2007 |
| JP | 2009-002860 | 1/2009 |

*Primary Examiner* — Ian Jen
(74) *Attorney, Agent, or Firm* — Harness, Dickey & Pierce, P.L.C.

(57) ABSTRACT

A position detection device for a horizontal articulated robot includes a camera for imaging the robot or a work as an imaging object, a control section for calculating a location of the imaging object from an image, an acquisition section (I/O) for obtaining the drive amounts of first and second electric motors of the robot, and a storage section for storing the calculated location of the imaging object and the drive amounts so as to correspond to each other. A common trigger signal for detecting the location of the imaging object is input to the camera and the I/O. The camera starts to image the imaging object in response to the input of the trigger signal. The I/O starts to obtain the drive amounts in response to the input of the trigger signal.

11 Claims, 3 Drawing Sheets

(56) References Cited

U.S. PATENT DOCUMENTS

| | | | |
|---|---|---|---|
| 2009/0249606 A1* | 10/2009 | Diez | B23K 11/11 29/428 |
| 2009/0289591 A1* | 11/2009 | Kassow | B25J 9/1671 318/568.13 |
| 2009/0306825 A1* | 12/2009 | Li | B25J 9/1669 700/261 |
| 2010/0021051 A1* | 1/2010 | Melikian | B25J 9/1697 382/153 |
| 2011/0004467 A1* | 1/2011 | Taub | G10L 25/90 704/207 |

* cited by examiner

POSITION DETECTION DEVICE FOR ROBOT, ROBOTIC SYSTEM, AND POSITION DETECTION METHOD FOR ROBOT

This application claims priority to Japanese Patent Application No. 2011-029904 filed Feb. 15, 2011 which is hereby expressly incorporated by reference herein in its entirety.

BACKGROUND

1. Technical Field

The invention relates to a position detection device for a robot, a robotic system, and a position detection method for a robot, each for detecting a position of the robot or a work the robot conveys based on an image.

2. Related Art

As described in, for example, JP-A-2009-2860, there has been known a method of detecting the position of an end effector provided to a robot and the position of a work gripped by the end effector of the robot based on an image. FIG. 5 shows an example of applying the method described above to position detection of a robot and position detection of a work performed in the middle of the operation of conveying the work.

As shown in FIG. 5, a horizontal articulated robot 40 (hereinafter referred to as a robot 40) incorporates a first electric motor 41a for rotating a first arm 42 coupled to a base 41 and a second electric motor 43a for rotating a second arm 43 coupled to the first arm 42. The first arm 42 and the second arm 43 constituting the robot 40 move to the positions corresponding to the respective drive amounts of the first electric motor 41a and the second electric motor 43a. Thus, the robot 40 grips a work W mounted on a mounting stage 51 with an end effector 45 coupled to the tip of a spline 44 at a grip position P1, and then conveys the work W from the grip position P1 to an imaging position P2 directly above a camera 52.

In a robot controller 60, there are installed a control section 61 for interpreting and then executing an action program stored in the robot controller 60, and a motor driver 62 for outputting drive signals to respective drive sources based on a control signal output by the control section 61. Further, in the robot controller 60, there is installed an image processing section 63 for calculating the position of one of the end effector 45 and the work W from the image taken by the camera 52. Further, in the robot controller 60, there is installed a storage section 64 for storing a variety of data required for the control of the robot 40, and the storage section 64 stores position data 64a representing the coordinate of the grip position P1 and the coordinate of the imaging position P2.

Further, when detecting the position of the work W with respect to the end effector 45, the control section 61 firstly interprets the action program for detecting the grip condition of the work W, and then calculates the drive amounts of the respective drive sources for moving the end effector 45 from the current position to the grip position P1. Subsequently, the drive signals based on the calculation result of the control section 61 are output from the motor 62 to the first electric motor 41a and the second electric motor 43a. Thus, the end effector 45 moves to the grip position P1 and then grips the work W.

Subsequently, the control section 61 calculates the drive amounts of the respective drive sources for moving the end effector 45 from the grip position P1 to the imaging position P2, and the motor driver 62 outputs the drive signals based on the calculation result of the control section 61 to the first electric motor 41a and the second electric motor 43a. Thus, the end effector 45 moves to the imaging position P2 while gripping the work W.

Then, when determining that the end effector 45 reaches the imaging position P2 based on output signals output by an encoder of the first electric motor 41a and an encoder of the second electric motor 43a, the control section 61 outputs the control signal for driving the camera 52. Thus, when the camera 52 images the work W gripped by the end effector 45, and the control section 61 outputs a signal for obtaining the image, the image taken by the camera 52 is input to the image processing section 63. Then, the image processing section 63 calculates the position of the work W from the image, and at the same time, the control section 61 calculates the position of the work W with respect to the end effector 45 based on the result of the calculation and the coordinate of the imaging position P2.

Incidentally, in the method described above, the movement of the end effector 45 is stopped at the imaging position P2 when imaging the work W while it is being gripped by the end effector 45. Further, the actual position of the end effector 45 is treated as the imaging position P2 set in advance.

However, in such a method, the movement of the robot 40 is stopped every time the action for detecting the gripping condition of the work W is performed, and if such a gripping condition is detected in the process of conveying the work W, the conveying efficiency of the work W is spontaneously degraded. Incidentally, besides the action for detecting the gripping condition of the work W, in the case of detecting the position of the end effector 45 in the process of other actions, the efficiency of the primary process the robot 40 should perform is similarly degraded after all as long as the movement of the end effector 45 is stopped at the imaging position P2. In other words, in the method described above, the process of making the condition of the robot calculated from the taken image correspond to the drive amounts of the respective drive sources degrades the efficiency of the other processes.

SUMMARY

An advantage of some aspects of the invention is to provide a position detection device for a robot, a robotic system, and a position detection method for a robot, each capable of enhancing the efficiency of the process of making the drive amount of the drive source correspond to the actual condition of the robot based on the image.

An aspect of the invention is directed to a position detection device for a robot, including an imaging section adapted to image at least one of the robot and a work held by the robot as an imaging object during a movement of the robot, a calculation section adapted to calculate a location of the imaging object from an image taken by the imaging section, an acquisition section adapted to obtain a drive amount in a drive source of the robot, and a storage section adapted to store the calculated location of the imaging object and the drive amount so as to correspond to each other, wherein a common trigger signal adapted to detect the location of the imaging object is input to the imaging section and the acquisition section, the imaging section starts to image the imaging object in response to the trigger signal, and the acquisition section starts to obtain the drive amount in response to the trigger signal.

According to the position detection device for a robot of this aspect of the invention, the imaging section images the imaging object and the acquisition section obtains the drive amount of the drive source in response to the trigger signal for detecting the location of the imaging object. As a result, such a trigger signal is input to both the imaging section and the acquisition section. In other words, the imaging section and the acquisition section are driven by the common trigger signal. Therefore, even in the case of imaging the robot and the work in motion as the imaging object, as long as the imaging section and the acquisition section are driven by the common single trigger signal, the image taken by the imaging section and the drive amount obtained by the acquisition section become approximated on the time axis.

It should be noted that the fact that the image of the robot itself and the location of the robot are correlated with each other deservingly leads to the fact that the image of the work held by the robot and the location of the robot also have a strong correlation with each other. Therefore, according to the configuration described above, the two pieces of information obtained from the robot in motion, namely the location of the robot obtained from the image and the drive amount of the drive source in that location, are made to correspond to each other as those approximate on the time axis. Further, since such a process of making correspondence is performed on the robot in motion, it is possible to reduce or eliminate the period in which the robot stops for detecting the location of the robot and the period for reaccelerating the robot, which has once stopped. Therefore, it is possible to enhance the efficiency of the process of making the drive amount of the drive source provided to the robot and the actual state of the robot correspond to each other based on the image.

It is preferable that the position detection device further includes a command output section adapted to detect whether or not one of the robot and the work held by the robot as a detection object reaches a predetermined position, and then output the common trigger signal to the imaging section and the acquisition section in response to the detection object reaching the predetermined position.

According to this configuration, the imaging section and the acquisition section are driven when the robot or the work held by the robot reaches the predetermined position. Therefore, the image taken by the imaging section and the drive amount obtained by the acquisition section always correspond to those obtained when the robot or the work held by the robot reaches the predetermined position. According to such a configuration, it becomes difficult for the images taken by the imaging section to be significantly different from each other between the chances of inputting the trigger signal described above. Therefore, it is possible to take a simple configuration in advance as the procedure of calculating the location of the imaging object from the image taken by the imaging section. Further, it is possible to improve the accuracy of the result obtained by such image processing, namely the accuracy of the location of the imaging object.

It is preferable that the detection object of the command output section corresponds to the imaging object of the imaging section, and the command output section detects whether or not the detection object reaches an imaging area of the imaging section.

According to this configuration, the imaging section and the acquisition section are driven when the imaging object of the imaging section reaches the imaging area. Therefore it is possible to make certain that the image taken by the imaging section includes the imaging object, and further, the imaging object is imaged at such a level that the location of the imaging object can be calculated. Therefore, it is possible to further enhance the accuracy of the result obtained by the image processing described above, namely the accuracy of the location of the imaging object.

It is preferable that the imaging object corresponds to the work, and an end effector adapted to grip the work is optically shielded by the work with respect to the imaging section in an imaging area of the imaging section.

According to this configuration, the location of the work is calculated based on the image of the work taken by the imaging section, while the location of the end effector is calculated based on the drive amount obtained by the acquisition section. Therefore, it is possible to make the location of the work and the location of the end effector gripping the work correspond to each other even in the case in which it is not achievable to image the end effector by the imaging section. In other words, even in the case in which it is not possible to detect the location of the end effector by the imaging section, it is possible to determine the relative location between the end effector and the work. As a result, it is possible to ease the burden of disposing the imaging section so that both the end effector and the work can be imaged. Further, since it becomes possible to design the imaging area of the imaging section so as to be located at the position specialized for the work, it becomes possible to enhance the accuracy of the location of the work calculated from the image.

It is preferable that the storage section stores a target position of the imaging object and a drive amount of the drive source so as to correspond to each other, and the position detection device further includes a correction section adapted to correct a correspondence relationship between the target position and the drive amount for reaching the target position based on a correspondence relationship between the calculated location and the drive amount stored in the storage section.

According to this configuration, it is possible to make the drive amount of the drive source provided to the robot and the actual state of the robot correspond to each other based on the image, and at the same time, correct the drive amount of the drive source based on the correspondence relationship.

Another aspect of the invention is directed to a robotic system, including a robot adapted to convey a work, and a position detection device for the robot, adapted to detect one of a location of the robot and a location of the work conveyed by the robot, wherein the position detection device for the robot corresponds to any one of the position detection devices for a robot according to the above aspects of the invention.

According to the robotic system of this aspect of the invention, it is possible to provide a robotic system capable of enhancing the efficiency of the process of making the drive amount of the drive source provided to the robot and the actual state of the robot correspond to each other based on the image.

Still another aspect of the invention is directed to a position detection method for a robot, including imaging at least one of the robot and a work held by the robot as an imaging object during a movement of the robot, calculating a location of the imaging object from an image taken in the imaging step, obtaining a drive amount in a drive source of the robot, and storing the calculated location of the imaging object and the drive amount so as to correspond to each other, wherein the imaging and obtaining steps start in response to a single trigger signal.

According to the position detection method for a robot of this aspect of the invention, the imaging of the imaging object and the acquisition of the drive amount of the drive source are started in response to the single trigger signal for detecting the location of the imaging object. Therefore, even in the procedure of the imaging taking the robot and the work in motion as the imaging object, the image of the imaging object and the drive amount of the drive source are made to correspond to each other as those approximate on the time axis. In other words, since such a process of making correspondence is performed on the robot in motion, it is possible to reduce or eliminate the period in which the robot stops for detecting the location of the robot and the period for reaccelerating the robot, which has once stopped. Therefore, it is possible to enhance the efficiency of the process of detecting the location of the robot from the image.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
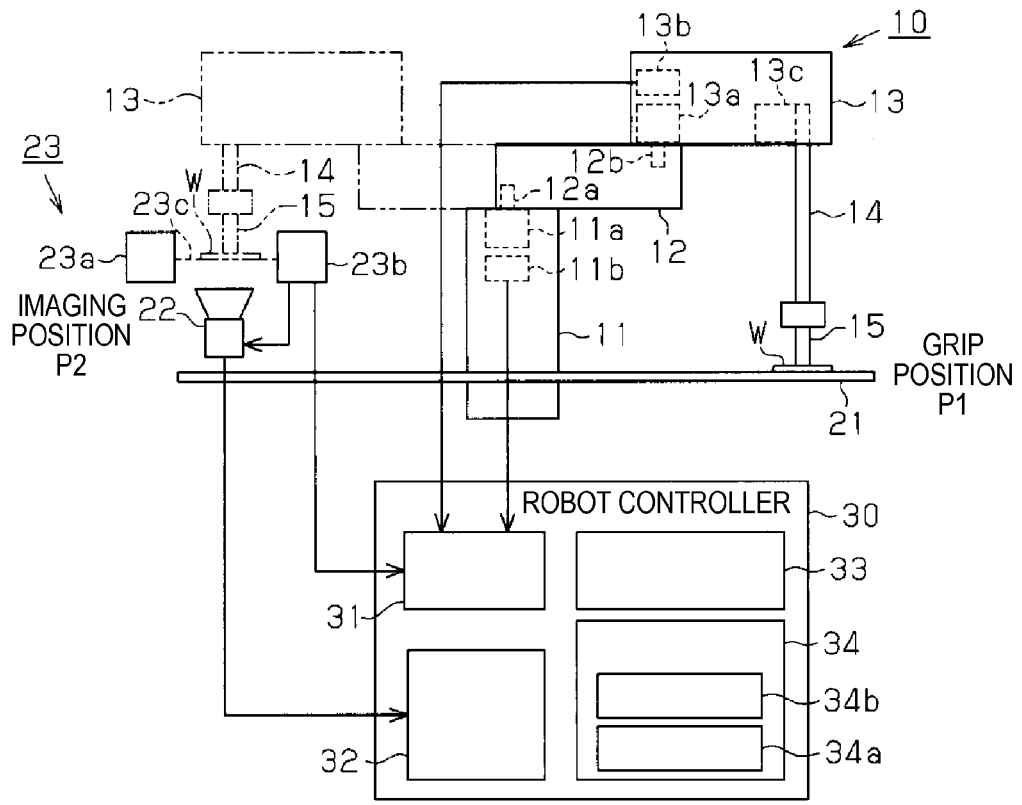
FIG. 1 is a diagram showing a schematic configuration of a robotic system according to an embodiment of the invention.
Figure 2:
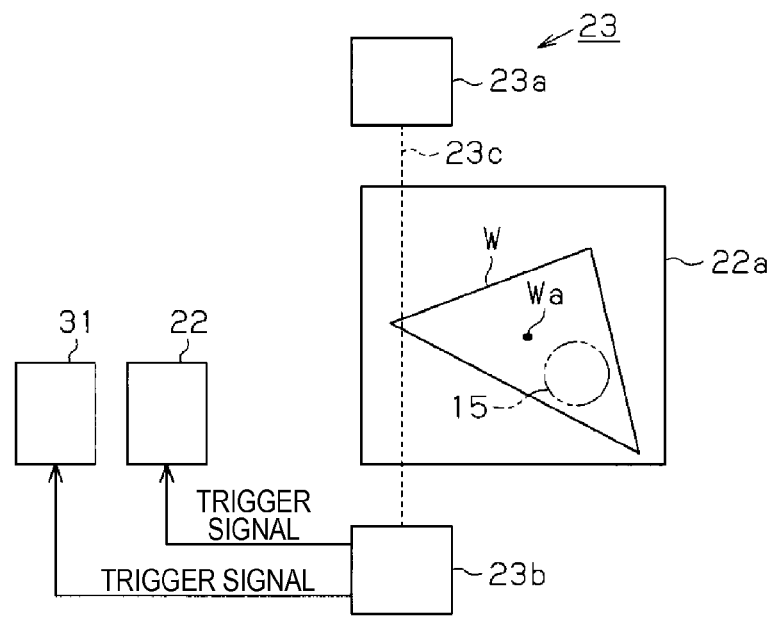
FIG. 2 is a diagram showing a relationship between an imaging area and a work gripped by an end effector when generating a trigger signal in the embodiment.
Figure 3:
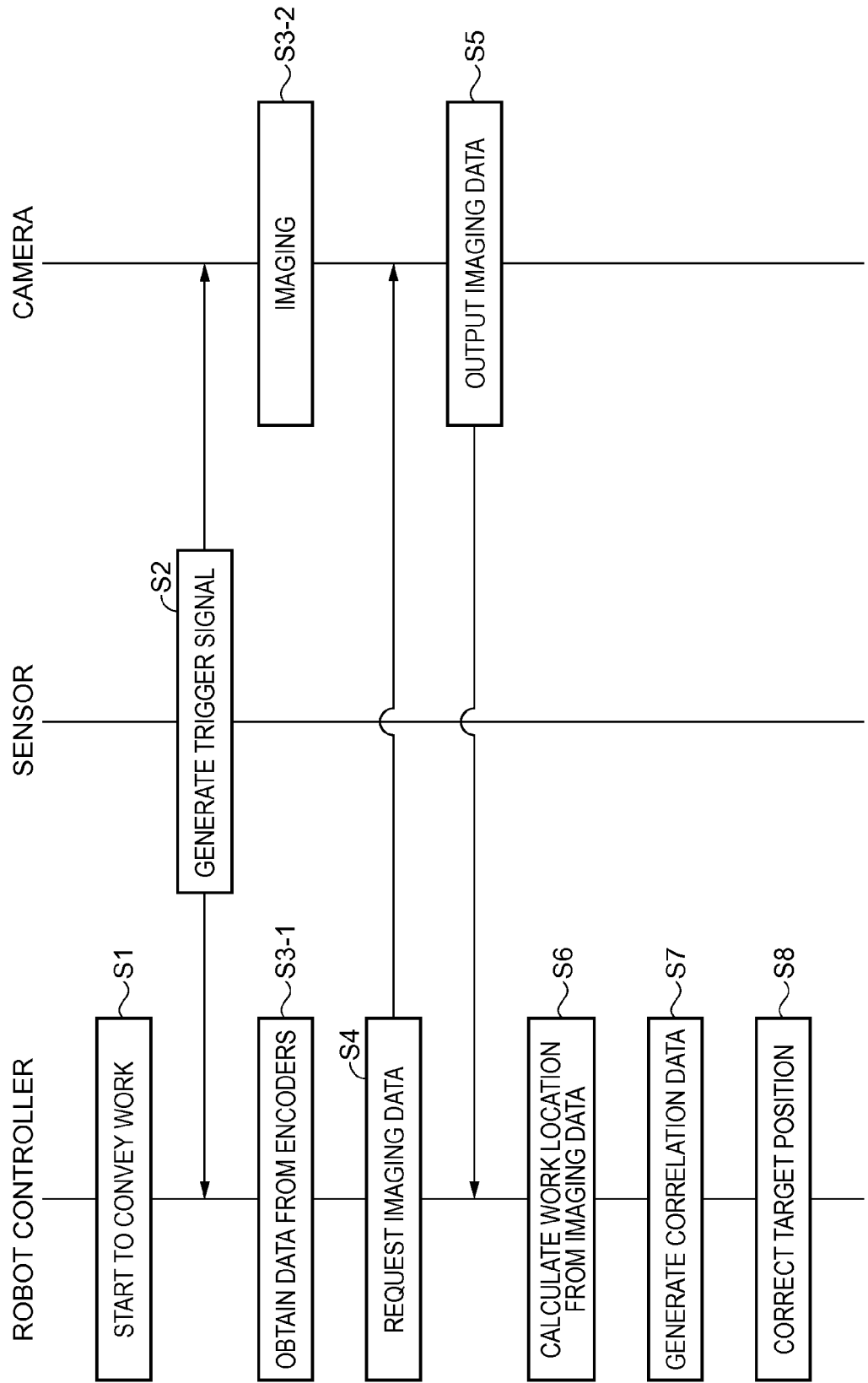
FIG. 3 is a flowchart showing a procedure of a position detection process of the robot.

A position detection device for a robot, a robotic system, and a position detection method of a robot according to an embodiment of the invention will be explained with reference to FIGS. 1 through 3.

Robotic System

Firstly, a schematic configuration of the robotic system will be explained with reference to FIG. 1. As shown in FIG. 1, the horizontal articulated robot (hereinafter referred to as a robot) 10 includes a base 11 to which a first arm 12 is rotatably coupled in a horizontal direction with respect to the base 11 via a first rotary shaft 12a extending in a vertical direction. In the base 11, there is incorporated a first electric motor 11a as a drive source, which rotates the first rotary shaft 12a to thereby rotate the first arm 12. Further, in the base 11, there is installed a first encoder 11b for detecting and then outputting the number of rotations as the drive amount of the first electric motor 11a.

A second arm 13 is rotatably coupled to the tip of the first arm 12 in a horizontal direction with respect to the first arm 12 via a second rotary shaft 12b extending in a vertical direction. In the second arm 13, there is installed a second electric motor 13a as a drive source, which rotates the second rotary shaft 12b to thereby rotate the second arm 13. Further, in the second arm 13, there is installed a second encoder 13b for detecting and then outputting the number of rotations as the drive amount of the second electric motor 13a.

A spline 14 penetrating the second arm 13 in a vertical direction is disposed on the tip of the second arm 13 to thereby be movable in a vertical direction, namely an up/down direction, with respect to the second arm 13. In the second arm 13, there is installed a third motor 13c for moving the spline 14 in an up/down direction while rotating the spline 14. An end effector 15 is coupled to the tip of the spline 14 for gripping the work W as a conveying object of the robot 10. The work W is mounted at the grip position P1 to be the position where the gripping of the work W by the end effector 15 is performed on, for example, a stationary mounting stage 21.

When performing the gripping of the work W in such a robot 10, the end effector 15 located at a predetermined position to be a starting point of the operation moves to, for example, a position directly above the grip position P1 due to the rotation of the first arm 12 by the rotation of the first electric motor 11a and the rotation of the second arm 13 by the second electric motor 13a. It should be noted that the drive amount and the drive direction of the first electric motor 11a and the drive amount and the drive direction of the second electric motor 13a are determined in accordance with the track of the end effector 15 connecting the starting point described above and the grip position P1. Further, when the end effector 15 reaches the position directly above the grip position P1, the third electric motor 13c described above rotates to thereby make the spline 14 descend toward the work W while rotating. When the end effector 15 descends to the position where the end effector 15 coupled to the tip of the spline 14 can interact with the work W due to the descent of the spline 14, the end effector 15 starts to grip the work W mounted on the mounting stage 21.

Subsequently, when the spline 14 rises to a predetermined height position at which no collision with, for example, objects on the mounting stage 21 occurs, the first arm 12 and the second arm 13 rotate again to thereby move the end effector 15 located at the grip position P1 to, for example, the position directly above the conveyance destination of the work W as a terminal point of the action of the robot 10. Then, the end effector 15 having reached the conveyance destination due to the descent of the spline 14 releases the grip of the work W to thereby dispose the work W on the conveyance destination.

Meanwhile, at the position where the work W gripped by the end effector 15 described above can be imaged in the periphery of the robot 10, there is disposed a camera 22 as an imaging section. The camera 22 is disposed so as to be able to capture the work W as the imaging object in the imaging area of the camera 22 from the position directly beneath the work W. In other words, the camera 22 is disposed so as to be able to set the imaging position P2 on the track of the end effector 15 such as the shortest way connecting the starting point and the terminal point of the movement of the end effector 15 in the imaging area. Further, the image taken by the camera 22 is stored in the storage section provided to the camera 22 for a predetermined period of time.

An optical sensor 23 as a command output section is disposed in the vicinity of the camera 22. The optical sensor 23 has a light projection section 23a formed of a device for outputting light such as a semiconductor laser, and a light receiving section 23b formed of a device such as a light receiving element for receiving the light output by the light projection section 23a. A detection light beam 23c output from the light projection section 23a is formed between the light projection section 23a and the light receiving section 23b so as to traverse the imaging area of the camera 22 described above. Further, if the light receiving section 23b fails to receive the light output by the light projection section 23a, the light receiving section 23b outputs a trigger signal for detecting the location of the work W such as the centroid location of the work W.

A robot controller 30 is connected to the robot 10 for controlling the actions of the first arm 12, the second arm 13, the spline 14, the end effector 15, and so on. In the robot controller 30, there are installed a control section 33 for interpreting and then executing an action program stored in the robot controller 30, and a motor driver (not shown) for outputting drive signals to the respective drive sources based on a control signal output by the control section 33. The control section 33 calculates the track of the movement of the end effector 15, and at the same time, calculates the drive amount of the first electric motor 11a and the drive amount of the second electric motor 13a for making the end effector 15 move along the track. Then, the control section 33 makes the motor driver output the drive signals for driving the respective drive sources with the drive amounts based on the calculation result.

In the robot controller 30, there is installed an input/output section (hereinafter referred to as an I/O) 31 for constituting an acquisition section for performing input and output of a variety of signals. To the I/O 31, there are input the data representing the revolution of the first electric motor 11a from the first encoder 11b at a predetermined detection cycle, and the data representing the revolution of the second electric motor 13a from the second encoder 13b similarly at a predetermined detection cycle. It should be noted that the data representing the revolution of the third electric motor 13c described above is also input from an encoder (not shown) to the I/O 31 described above at a predetermined detection cycle.

If an end of the work W gripped by the end effector 15 traverses the detection light beam 23c, a common trigger signal is input to the camera 22 and the I/O 31 from the light receiving section 23b of the optical sensor 23. The camera 22 starts imaging in response to receiving the trigger signal, and images the work W existing in the imaging area 22a. Further, the control section 33 determines that the trigger signal is input to the I/O 31 due to the reception of the trigger signal by the I/O 31. Subsequently, the control section 33 obtains the latest data representing the revolution of the first electric motor 11a, the latest data representing the revolution of the second electric motor 13a, and the latest data representing the revolution of the third electric motor 13c through the I/O 31. Then, after obtaining the latest data representing the revolutions, the control section 33 constituting the acquisition section calculates the location (x2, y2, z2) of the end effector 15 based on the data.

In the robot controller 30, there is installed an image processing section 32 as a calculation section. After receiving the data corresponding to the image taken by the camera 22, the image processing section 32 calculates the location (x1, y1, z1) of the centroid of the work W based on the data related to the image, and then outputs the location to the control section 33. Then, when obtaining the centroid location of the work W, the control section 33 corrects the terminal point of the end effector 15 in the present action, the starting point of the end effector 15 in the subsequent action, and so on based on the difference between the centroid location of the work W and the location of the end effector 15. In other words, the control section 33 also functions as a correction section for correcting the action of the robot 10 using the centroid location of the work W and the location of the end effector 15 obtained in response to the common trigger signal.

Further, a storage section 34 is installed in the robot controller 30 for storing a program and a variety of data related to the action control of the robot 10. In the storage section 34, there is stored robot data 34a such as the length of each of the arms or the coupling destination of each of the arms for calculating the posture of the robot 10 from the track based on the target position of the end effector 15. Further, in the storage section 34, there is stored a correspondence relationship for making the target position of the end effector 15 and the drive amounts of the respective electric motors 11a, 13a, such as a relational expression for calculating the drive amounts of the respective electric motors 11a, 13a from the posture of the robot 10 using the reduction ratio of the reduction gear coupled to the respective electric motors 11a, 13a, the initial locations of the respective electric motors 11a, 13a, and so on. Further, in the storage section 34, there is stored correlation data 34b as the data obtained by making the centroid location of the work W and the location of the end effector 15 obtained in response to the common trigger signal correspond to each other. Further, in the storage section 34, there is stored data for calculating the centroid location of the work W from the image of the work W such as a calculation formula for calculating the centroid of the work W from the data representing the outline of the work W or the outline itself.

It should be noted that in the present embodiment, the position detection device of the robot 10 is composed of the camera 22, the optical sensor 23, and the robot controller 30.

Next, a function of the robotic system having the constitution, described above will be explained together with the procedure of the robot controller 30 controlling the action of the robot 10.

In the case of moving the end effector 15 located at a predetermined position to be the starting point of the action to the grip position P1, the control section 33 firstly obtains the data representing the revolutions of the respective electric motors 11a, 13a from the first encoder 11b and the second encoder 13b, respectively, to thereby determine the present location of the end effector 15. Then, the control section 33 calculates the track connecting the present location of the end effector 15 and the grip position P1 as the target position stored in the storage section 34, and at the same time, calculates the drive amounts of the respective electric motors 11a, 13a for moving the end effector 15 along the track. Subsequently, the control section 33 makes the motor driver output the drive signals corresponding respectively to the drive amounts to the first electric motor 11a and the second electric motor 13a. Thus, the end effector 15 located at the predetermined position moves toward the grip position P1 due to the movement of the first arm 12 and the second arm 13.

When the end effector 15 of the robot 10 reaches the position directly above the drip position P1, the robot controller 30 moves the spline 14 downward to thereby make the end effector 15 coupled to the tip of the spline 14 come close to the work W mounted on the mounting stage 21. It should be noted that on this occasion, the control section 33 calculates the descent amount of the spline 14 based on the difference between the location of the tip of the spline 14 obtained from the encoder of the third motor (not shown) mounted on the second arm 13 and the position in the vicinity of the surface of the mounting stage 21 stored in the storage section 34 as the target position. Then, the control section 33 outputs the drive signal corresponding to the descent amount from the motor driver to the third motor 13c.

Subsequently, in the case of moving the end effector 15 gripping the work W from the grip position P1 to the conveyance destination as the terminal point of the action, the control section 33 raises the tip of the spline 14 located in the vicinity of the surface of the mounting stage 21 to a predetermined position, such as the height position at which no collision with objects or the like on the mounting stage 21 occurs. In order to achieve the above, the difference between the present location of the tip of the spline 14 and the predetermined position thereof described above is calculated. Then, the control section 33 outputs the drive signal corresponding to the difference from the motor driver to the third motor 13c. Subsequently, the control section 33 calculates the track connecting the present location of the end effector 15 and the conveyance destination stored in the storage section 34 when the end effector 15 is located at the position directly above the grip position P1, and at the same time, calculates the drive amounts of the respective electric motors 11a, 13a for moving the end effector 15 along the track. It should be noted that the present location of the end effector 15 is calculated based on the output signals of the first encoder 11b and the second encoder 13b as described above. Further, the control section 33 makes the motor driver output the drive signals corresponding to the drive amounts to the electric motors 11a, 13a, respectively.

In the manner described above, the robot 10 controlled by the robot controller 30 traverses the imaging area of the camera 22 described above in the state in which the end effector 15 grips the work W while conveying the work W from the grip position P1 to the conveyance destination.

Generation Method of Trigger Signal

Next, generation of the trigger signal by the optical sensor 23 described above will be explained with reference to FIG. 2. As shown in FIG. 2, the imaging area 22a of the camera 22 described above has a dimension sufficient enough for setting the entire work W in the inside thereof, and has, for example, a rectangular plane-like shape. As described above, the camera 22 is disposed so that the work W gripped by the end effector 15 can be set in the imaging area 22a from the position directly beneath the work W. Therefore, the end effector 15 gripping the work W traverses the imaging area 22a during the movement of the robot 10.

The optical sensor 23 is disposed in the vicinity of the imaging area 22a so that the detection light beam 23c described above traverses the imaging area 22a. In other words, the light projection section 23a and the light receiving section 23b constituting the optical sensor 23 are disposed across the imaging area 22a from each other. Further, the light projection section 23a and the light receiving section 23b are disposed at the positions with which the entire work W can be set in the imaging area 22a when either one of the end portions of the work W traverses the detection light beam 23c regardless of which one of the end portions of the work W traverses the detection light beam 23c.

It should be noted that the area of the work W, which traverses the imaging area 22a, is large enough to cover the entire tip portion of the end effector 15. Therefore, the end effector 15 is optically shielded by the work W with respect to the camera 22 described above. Therefore, only the work W is shown in the image taken by the camera 22.

In the case in which the work W gripped by the end effector 15 described above is imaged by the camera 22, the work W firstly enters the imaging area 22a described above in the process of conveying the work W from the grip position P1 to the conveyance destination. Then, when one end of the work W traverses the detection light beam 23c, the light output from the light projection section 23a is blocked by the work W, which causes the light receiving section 23b to fail to receive the light output by the light projection section 23a. In response thereto, the light receiving section 23b generates the trigger signal for starting imaging in the camera 22 and for starting acquisition of the data from the first encoder 11b and the second encoder 13b in the I/O 31 of the robot controller 30. Then, the light receiving section 23b outputs the single trigger signal in common to the camera 22 and the I/O 31 of the robot controller 30. Subsequently, the imaging in the camera 22 and the acquisition of the signals described above in the I/O 31 of the robot controller 30 are started based on the common trigger signal. Thus, it is possible for the I/O 31 to obtain the location of the end effector 15 when imaging the work W.

Position Detection Process of Robot

Hereinafter, the procedure of the process performed for the robot controller 30, the optical sensor 23, and the camera 22 for detecting the location of the robot 10, and in particular of the end effector 15 provided to the robot 10, will be explained with reference to FIG. 3.

In the present process, firstly, the robot controller 30 operates the first arm 12 and the second arm 13 to thereby move the end effector 15 of the robot 10 located at the starting point to the grip position P1. Then, when the end effector 15 moves to the grip position P1, the robot controller 30 makes the end effector 15 grip the work W, and then starts (step S1) the conveyance of the work W by the robot 10 from the grip position P1 toward the conveyance destination as shown in FIG. 3.

Then, if one end of the work W enters the imaging area 22a of the camera 22, and then traverses the detection light beam 23c of the optical sensor 23 during motion of the robot 10, namely if the end effector 15 reaches the imaging position P2 or the vicinity of the imaging position P2, the light output by the light projection section 23a is blocked by the work W to thereby be prevented from reaching the light receiving section 23b. Thus, the optical sensor 23 detects the fact that the work W gripped by the end effector 15 has reached the imaging position P2. Since the light receiving section 23b of the optical sensor 23 fails to receive the light as a trigger, the light receiving section 23b generates a single trigger signal, and then outputs (step S2) the trigger signal to the I/O 31 of the robot controller 30 and the camera 22.

The control section 33 having received the trigger signal via the I/O 31 obtains (step S3-1) the latest data out of the data input from the first encoder 11a and the second encoder 13b at every predetermined detection period via the I/O 31. Then, the control section 33 of the robot controller 30 calculates the location of the end effector 15 based on the signal obtained in the step S3-1 and the robot data 34a stored in the storage section 34 described above. Further, the camera 22 having received the trigger signal parallel to the trigger signal received by the robot controller 30 release the shutter to thereby image (step S3-2) the work W set in the imaging area 22a.

Subsequently, the robot controller 30 requests (step S4) the camera 22 to output the data due to the imaging started in accordance with the common trigger signal to the image processing section 32 of the robot controller 30. The camera 22 having received such a request outputs (step S5) the imaging data described above to the image processing section 32. When the reception of the imaging data by the image processing section 32 is completed, the image processing section 32 calculates (step S6) the location of the centroid Wa of the work W based on the imaging data.

The control section 33 of the robot controller 30 generates (step S7) the correlation data 34b having the location of the end effector 15 previously calculated and the location of the centroid Wa of the work W correspond to each other. Further, the control section 33 calculates the difference between the location of the centroid Wa of the work W and the location of the end effector 15, and then corrects (step S8) the target position to which the work W should be conveyed based on the difference and the correspondence relationship described above.

According to the embodiment explained hereinabove, it becomes possible to obtain, at least, the advantages recited below.

1. The camera 22 starts to image the end effector 15 and the I/O 31 of the robot controller 30 starts to acquire the drive amounts of the first electric motor 11a and the second electric motor 13a in accordance with the trigger signal for detecting the location of the end effector 15. In other words, the camera 22 and the I/O 31 are driven by the common trigger signal. Therefore, even if the work W gripped by the robot 10 in motion is the imaging object, the image taken by the camera 22 and the latest drive amount obtained by the I/O 31 are approximated on the time axis as long as the trigger signal input to the I/O 31 and the trigger signal input to the camera 22 are parallel to each other. Therefore, the two pieces of information obtained from the robot 10 in motion, namely the location of the end effector 15 of the robot 10 obtained from the image, and the drive amounts of the first electric motor 11a and the second electric motor 13a at the location, are made to correspond to each other as those approximate on the time axis. Further, since such a process of making correspondence is performed on the robot 10 in motion, it is possible to reduce or eliminate the period in which the robot 10 stops for detecting the location of the end effector 15 and the period for reaccelerating the robot 10, which has once stopped. Therefore, it is possible to improve the efficiency of the process of making the drive amounts of the first electric motor 11a and the second electric motor 13a provided to the robot 10 and the actual state of the robot 10 correspond to each other based on the image.

2. The camera 22 and the I/O 31 are driven when the work W gripped by the robot 10 traverses the detection light beam 23c. Therefore, the image taken by the camera 22 and the drive amounts obtained by the I/O 31 always correspond to those obtained when the work W gripped by the robot 10 reaches the predetermined position. According to such a configuration, it becomes difficult for the images taken by the camera 22 to be significantly different from each other between the chances of inputting the trigger signal described above. Therefore, it is possible to take a simple configuration in advance as the procedure of the process of calculating the location of the work W from the image taken by the camera 22, and further, it is also possible to improve the accuracy of the result obtained by such image processing, namely the accuracy of the location of the centroid Wa of the work W.

3. The camera 22 and the I/O 31 are driven when the imaging object of the camera 22 traverses the detection light beam 23c in the imaging area 22a. Therefore it is possible to make certain that the image taken by the camera 22 includes the work W, and further, the work W is imaged at such a level that the location of the centroid Wa of the work W can be calculated. Therefore, it is possible to further enhance the accuracy of the result obtained by the image processing, namely the accuracy of the location of the imaging object.

4. The centroid Wa of the work W is calculated based on the image of the work W taken by the camera 22, while the location of the end effector 15 can be calculated based on the drive amounts obtained by the I/O 31. Therefore, it is possible to make the location of the work W and the location of the end effector 15 gripping the work W correspond to each other even in the case in which it is not possible to image the end effector 15 by the camera 22. In other words, even in the case in which it is not possible to detect the location of the end effector 15 by the camera 22, it is possible to determine the relative location between the end effector 15 and the work W. As a result, it is possible to ease the burden of disposing the camera 22 so that both the end effector 15 and the work W can be imaged. Further, since it becomes possible to design the imaging area 22a of the camera 22 so as to be located at the position specialized for the work W, it also becomes possible to enhance the accuracy of the location of the centroid Wa of the work W calculated from the image.

5. The storage section 34 of the robot controller 30 stores the target position of the work W such as the grip position P1 or the conveyance destination, and the drive amounts of the first electric motor 11a and the second electric motor 13a so as to correspond to each other. Further, the control section 33 functions as the correction section for correcting the correspondence relationship between the target position described above and the drive amounts for reaching the target position based on the correspondence relationship between the location of the centroid Wa of the end effector 15 and the drive amounts, the correspondence relationship being stored in the storage section 34. Thus, it is possible to make the drive amounts of the first electric motor 11a and the second electric motor 13a provided to the robot 10 and the actual state of the robot 10 correspond to each other based on the image, and at the same time to correct the drive amounts of the first electric motor 11a and the second electric motor 13a based on the correspondence relationship.

It should be noted that the embodiment described above can also be put into practice with the following modifications if desired.

The work W can also be mounted in a location where the position of the work W moves with time such as a conveyer instead of the mounting stage 21.

Figure 4:
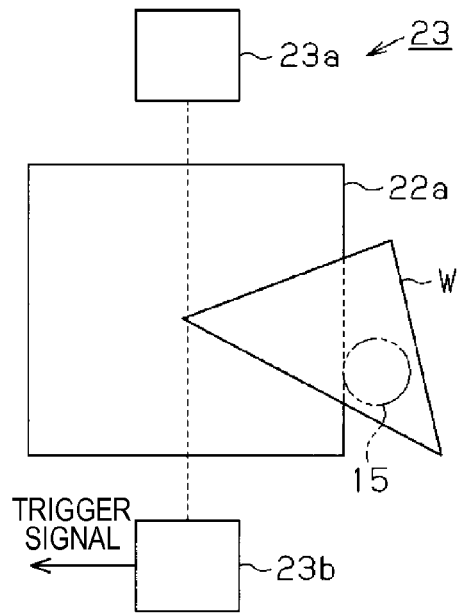
FIG. 4 is a diagram showing a relationship between the imaging area and the work gripped by the end effector when generating the trigger signal in a modified example.
Figure 5:
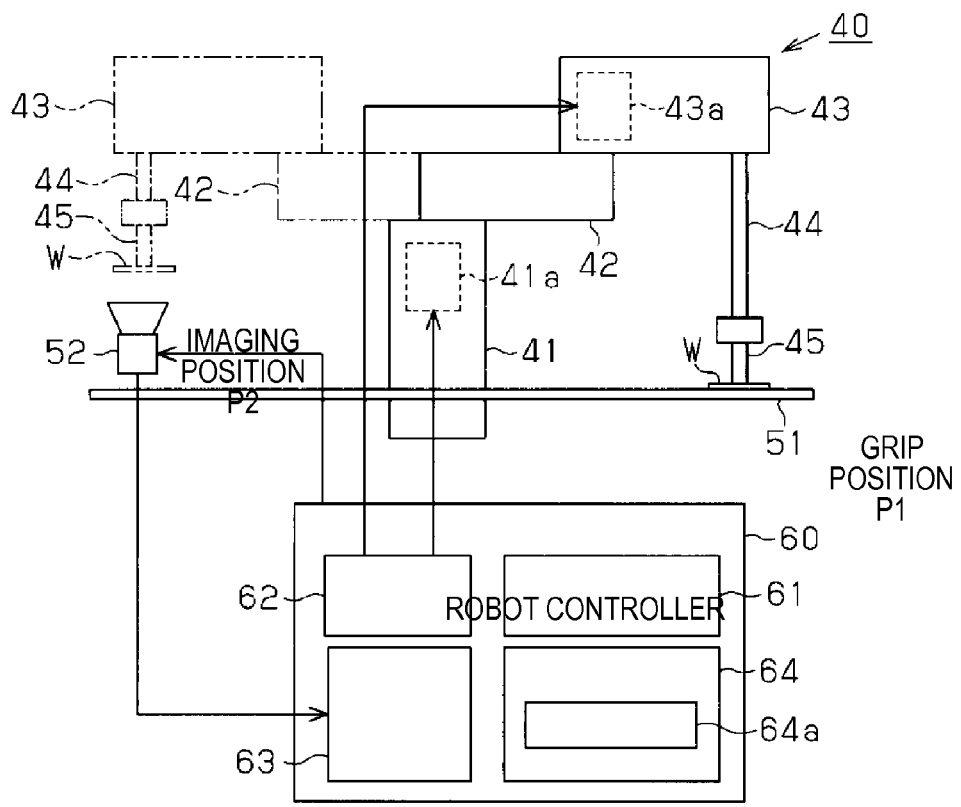
FIG. 5 is a diagram showing a schematic configuration of a robotic system of the related art.

The position of the camera 22, the size of the imaging area 22a, and the position of the optical sensor 23 are set so that the entire work W and the end effector 15 covered by the work W are set in the imaging area 22a. Besides this configuration, it is also possible to set the position of the camera 22, the size of the imaging area 22a, and the position of the optical sensor 23 so that the end effector 15 is not set in the imaging area 22a and only a part of the work W is set in the imaging area 22a when the imaging is performed by the camera 22 as shown in, for example, FIG. 4. On this occasion, if the storage section 34 of the robot controller 30 stores the information regarding the shape of the work W in advance, it is possible to calculate the location of the centroid Wa of the work W from the part of the work W thus imaged by the camera 22.

Although the location of the centroid Wa of the work W is calculated as the location of the work W, it is also possible to calculate any position other than the centroid Wa.

Although the robot 10 is realized as a horizontal articulated robot, it is also possible to realize it as a different robot such as a vertical articulated robot.

It is also possible to install the camera 22 described above in the robot 10 providing it can image the work W. For example, if the robot causes displacement between the tip of the end effector for gripping the work and the first joint as the coupling section between the base and the first arm, it is also possible to mount the camera on the first arm of the robot.

The imaging object of the camera 22 can be both the work W and the end effector 15, or can be the end effector 15 alone. Among these cases, if the imaging object of the camera 22 is both the work W and the end effector 15, it is possible to calculate the locations of both the work W and the end effector 15 from the image taken by the camera 22. Therefore, it is possible to make the location of the robot 10 or the end effector 15 based on the drive amount of the first electric motor 11a and the drive amount of the second electric motor 13a, and the locations of the work W and the end effector 15 based on the image correspond to each other. Further, if the imaging object of the camera 22 is the end effector 15, it is possible to make the location of the end effector 15 based on the image taken by the camera 22, and the location of the end effector 15 based on the drive amount described above correspond to each other.

The position where the optical sensor 23 detects the location of the end effector 15 can be different from the position of the imaging area 22a of the camera 22. For example, an anterior position of the imaging area 22a described above on the track of the end effector 15 can also be adopted. Even in such a configuration, as long as the end effector 15 moves along the track of the end effector 15, if the end effector 15 reaches the anterior position, it is possible to roughly determine when the end effector 15 moves inside the imaging area 22a. Further, it is sufficient to adopt a configuration in which the optical sensor 23 delays the output of the trigger signal after the optical sensor 23 detects the location of the end effector 15 as much as a predetermined time period to allow the imaging object to move into the imaging area 22a.

In the robot controller 30 described above, it is also possible to arrange that the timing at which the imaging object moves inside the imaging area 22a is estimated based on the result of a track calculation process of calculating the track of the robot 10 in advance. In addition, it is also possible to adopt a configuration in which the robot controller 30 outputs the common trigger signal to the camera 22 and the I/O 31 at the time thus estimated in such a manner as described above.

There is a case in which the imaging time as a time period from when the camera 22 receives the trigger signal as a command of starting the imaging process to when the camera 22 takes the image becomes much longer than the acquisition time as a time period from when the I/O 31 receives the trigger signal as a command of starting the acquisition process to when the I/O 31 obtains the drive amounts. In such a case, it is preferable to make the timing of inputting the trigger signal to the camera 22 precede the timing of inputting the trigger signal to the acquisition section, and at the same time, to compensate the difference between the imaging time and the acquisition time with the difference between the timings.

The common trigger signal input to the camera 22 and the I/O 31 is not limited to the trigger signal generated outside the robot controller 30, but can be an internal trigger signal generated inside the robot controller 30.

In essence, the trigger signal need only be a signal generated at the time when the imaging object moves into the imaging area 22a.

What is claimed is:

1. A position detection device for a robot comprising:
   an imaging section configured to take an image of an object located in an imaging area during movement of the robot, the object being held by an end effector of the robot;
   an image processor configured to calculate a centroid of the object based on the image taken by the imaging section;
   an acquisition section configured to obtain a drive amount of a drive source of the robot so as to calculate an end effector calculated position;
   a controller configured to correct an end effector location of the end effector; and
   a sensor including:
      a light projector that outputs a light; and
      a light receiver that receives the light, wherein
      the light traverses the imaging area of the imaging section so that the sensor is configured to generate a common trigger signal when the object is detected by the sensor based on the light, wherein
   the imaging section starts to take the image of the object when the imaging section receives the common trigger signal,
   the acquisition section starts to obtain the drive amount when the acquisition section receives the common trigger signal, and
   an object location of the object is detected based on the image and the drive amount, and
   the controller corrects the end effector location based on the centroid of the object and the end effector calculated position.

2. The position detection device for a robot according to claim 1, wherein
   the sensor configured to detect whether one of the robot and a work held by the robot as a detection object reaches a predetermined position, and then output the common trigger signal to the imaging section and the acquisition section in response to the detection object reaching the predetermined position.

3. The position detection device for a robot according to claim 2, wherein
   the detection object corresponds to the object of the imaging section, and
   the sensor detects whether the detection object reaches the imaging area of the imaging section.

4. The position detection device for a robot according to claim 1, wherein
   the object corresponds to a work held by the robot, and
   the end effector configured to grip the work is optically shielded by the work with respect to the imaging section in the imaging area of the imaging section.

5. The position detection device for a robot according to claim 1, further comprising:
   a calculation section configured to calculate the object location of the object from the image taken by the imaging section; and
   a storage section configured to store the calculated location of the object and the drive amount so as to correspond to each other, wherein
   the storage section stores a target position of the object and the drive amount of the drive source so as to correspond to each other, and the position detection device further comprises:
a correction section configured to correct a correspondence relationship between the target position and the drive amount for reaching the target position based on a correspondence relationship between the calculated location and the drive amount stored in the storage section.

6. A robotic system comprising:
a robot configured to convey a work; and
the position detection device for the robot according to claim 1, the position detection device being configured to detect one of a location of the robot and a location of the work conveyed by the robot.

7. A robotic system comprising:
a robot configured to convey a work; and
the position detection device for the robot according to claim 2, the position detection device being configured to detect one of a location of the robot and a location of the work conveyed by the robot.

8. A robotic system comprising:
a robot adapted to convey a work; and
the position detection device for the robot according to claim 3, the position detection device being configured to detect one of a location of the robot and a location of the work conveyed by the robot.

9. A robotic system comprising:
a robot adapted to convey a work; and
the position detection device for the robot according to claim 4, the position detection device being adapted to detect one of a location of the robot and a location of the work conveyed by the robot.

10. A robotic system comprising:
a robot adapted to convey a work; and
the position detection device for the robot according to claim 5, the position detection device being configured to detect one of a location of the robot and a location of the work conveyed by the robot.

11. A position detection method for a robot comprising:
taking an image of an object located in an imaging area during movement of the robot, the object being held by an end effector of the robot;
calculating a centroid of the object based on the image;
obtaining a drive amount of a drive source of the robot so as to calculate an end effector calculated position;
correcting an end effector location of the end effector; and
generating a common trigger signal when a sensor detects the object, wherein
the sensor includes:
a light projector that outputs a light; and
a light receiver that receives the light, wherein
the light traverses the imaging area so that the sensor detects the object based on the light,
the taking and the obtaining start in response to receiving the common trigger signal so that an object location of the object is detected based on the image and the drive amount, and
the end effector location is corrected based on the centroid of the object and the end effector calculated position.

* * * * *